US009811313B2

United States Patent
Johnson et al.

(10) Patent No.: US 9,811,313 B2
(45) Date of Patent: Nov. 7, 2017

(54) VOICE-TRIGGERED MACROS

(71) Applicant: Microsoft Technology Licensing, LLC, Redmond, WA (US)

(72) Inventors: Zachariah Glen Johnson, Woodinville, WA (US); Sreekar Choudhary, Bothell, WA (US); John Henson, Seattle, WA (US); Kandarp Jani, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 14/827,846

(22) Filed: Aug. 17, 2015

(65) Prior Publication Data

US 2017/0052760 A1     Feb. 23, 2017

(51) Int. Cl.
| | | |
|---|---|---|
| *G10L 21/00* | (2013.01) | |
| *G06F 3/16* | (2006.01) | |
| *A63F 13/215* | (2014.01) | |
| *A63F 13/424* | (2014.01) | |

(52) U.S. Cl.
CPC ............ *G06F 3/167* (2013.01); *A63F 13/215* (2014.09); *A63F 13/424* (2014.09)

(58) Field of Classification Search
CPC ... G10L 15/26; G10L 15/22; H04N 21/43615; G06F 3/167; H04L 12/282
USPC ................ 704/275, E15.045, 232, 236, 241; 379/201.01, 202.01; 348/734; 715/255, 715/704; 463/1, 29, 36
See application file for complete search history.

(56) References Cited

U.S. PATENT DOCUMENTS

| | | | |
|---|---|---|---|
| 5,774,841 A | 6/1998 | Salazar et al. | |
| 6,456,977 B1 | 9/2002 | Wang | |
| 8,337,305 B2 * | 12/2012 | Aronzon ................. | A63F 13/12 463/36 |
| 8,684,839 B2 | 4/2014 | Mattice et al. | |
| 9,033,781 B2 * | 5/2015 | Steir ....................... | A63F 13/12 463/1 |
| 9,367,869 B2 * | 6/2016 | Stark ....................... | G06T 13/40 |
| 2009/0327888 A1 | 12/2009 | Woolf et al. | |
| 2012/0122577 A1 | 5/2012 | Aronzon | |

(Continued)

FOREIGN PATENT DOCUMENTS

EP     1498163 A1     1/2005

OTHER PUBLICATIONS

"Talismoons Wolf Controller", Published on: May 3, 2013, Available at: http://www.realmodscene.com/index.php?/topic/1595-tortuga-coves-official-review-of-talismoon-wolf-controller-macros-mod-board-for-360/.

(Continued)

*Primary Examiner* — Charlotte M Baker
(74) *Attorney, Agent, or Firm* — Klarquist Sparkman, LLP (57) ABSTRACT

Systems, methods, and computer media for generating and invoking voice-triggered macros are disclosed herein. A buffer is configured to receive sensor data for one or more sensors. The sensor data reflects user actions. A macro generator is configured to receive a command to initiate creation of a voice-triggered macro and determine macro actions for inclusion in the voice-triggered macro based on the sensor data in the buffer. The macro generator is also configured to assign a speech key to the voice-triggered macro. When audio input is determined to match the speech key of the voice-triggered macro, the macro actions are performed.

20 Claims, 10 Drawing Sheets

(56) References Cited

U.S. PATENT DOCUMENTS

2014/0267933 A1* 9/2014 Young .............. H04N 21/42203
348/734
2014/0289778 A1 9/2014 Matsubayashi
2015/0297991 A1* 10/2015 Mahlmeister ....................... 3/22

OTHER PUBLICATIONS

"Voice Attack.com", Published on: Aug. 26, 2012, Available at: http://www.voiceattack.com/.
"Skyvoice", Published on: Jan. 1, 2014, Available at: http://www.nexusmods.com/skyrim/mods/28448/?.
Tse, et al., "GSI DEMO: Multiuser Gesture / Speech Interaction over Digital Tables by Wrapping Single User Applications", In Proceedings of 8th International Conference on Multimodal Interfaces, Nov. 2, 2006, pp. 76-83.
"Voice Activated Commands", Published on: Apr. 19, 2005 Available at: http://www.dwvac.com/.
"Windows Speech Recognition Macros", Published on: Jan. 20, 2011 Available at: http://windows-speech-recognition-macros.software.informer.com/12.0/.
"Voice Control Gaming Software Page (for Windows 7, Vista, XP)—Instant Download," Available at: http://www.broadenedhorizons.com/voice-control-gaming-software-package, 4 pages. (accessed Aug. 12, 2015).
Tazti, "MMO-RPG-FPS-RTS—Speech Recognition for PC Games," Available at: http://www.tazti.com/speech-recognition-software-for-pc-games.html, 1 page (accessed Aug. 12, 2015).
Microsoft Download Center, "Windows Speech Recognition Macros," Available at: http://www.microsoft.com/en-us/download/details.aspx?id=13045, 5 pages (accessed Aug. 12, 2015).

* cited by examiner

VOICE-TRIGGERED MACROS

BACKGROUND

Macros provide users the ability to perform a set of actions using a computing device once and store the performed actions for later recall without having to perform the actions again. For example, multiple key strokes or user interface selections can be recorded and associated with a particular keyboard key. Macros thus allow users to automate difficult or tedious tasks. Conventional macros, however, typically require interaction with various aspects of a user interface; such conventional macros can be too cumbersome to create in dynamic situations or in limited hardware or software environments where conventional macro creation user interfaces are difficult to provide or use.

SUMMARY

Examples described herein relate to voice-trigged macros. A buffer can be configured to receive sensor data for one or more sensors. The sensor data reflects one or more user actions. Sensor data can be, for example, game controller or body position sensor data representing user actions during video game play. A macro generator can be configured to receive a command to initiate creation of a voice-triggered macro and determine a plurality of macro actions for the voice-triggered macro based on the sensor data in the buffer. The macro generator can also be configured to assign a speech key to the voice-triggered macro. The voice-triggered macro can be stored, for example, locally, on a server, or in the cloud, and can be accessible to and usable by multiple users. When audio input is determined to match the speech key of the voice-triggered macro, the macro actions are performed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The foregoing and other objects, features, and advantages of the claimed subject matter will become more apparent from the following detailed description, which proceeds with reference to the accompanying figures.

DETAILED DESCRIPTION

Using the systems, methods, and computer-readable media described herein, voice-triggered macros can be generated, stored, shared, and invoked by users. Unlike conventional macros that typically require extensive interaction with a user interface, the technologies described herein allow a voice-triggered macro to be dynamically generated and invoked with limited interaction. Because the macros are voice-triggered, buttons, keys, or other controls are not needed to invoke the macros. The voice-triggered macros can also be created using voice commands. A user can, for example, instruct a virtual intelligent personal assistant or other voice recognition technology to record a series of actions and store the actions as a macro along with a speech key that is used to invoke the macro in the future.

As another example, in a console gaming environment in which a user plays a video game using a game controller and/or a body position sensor, existing functions are typically assigned to the limited number of buttons or other controls available to the user. With the technologies described herein, a user can instruct the console, using a voice command, gesture, or other interaction, to create a voice-triggered macro while the user is playing the video game. Voice commands can be used, for example, to indicate when to start and/or stop capturing user actions for the macro. The macro actions of the voice-triggered macro are based on sensor data (e.g., game controller data) reflecting the user actions. The user can also use a voice command to provide a speech key that the console associates with the voice-triggered macro. To invoke the actions of the voice-triggered macro in the future, the user speaks the speech key. In this way, the user is able to both create and invoke the voice-triggered macro during game play without compromising the user's ability to play. Additional examples are described in detail below with reference to FIGS. 1-10.

Figure 1:
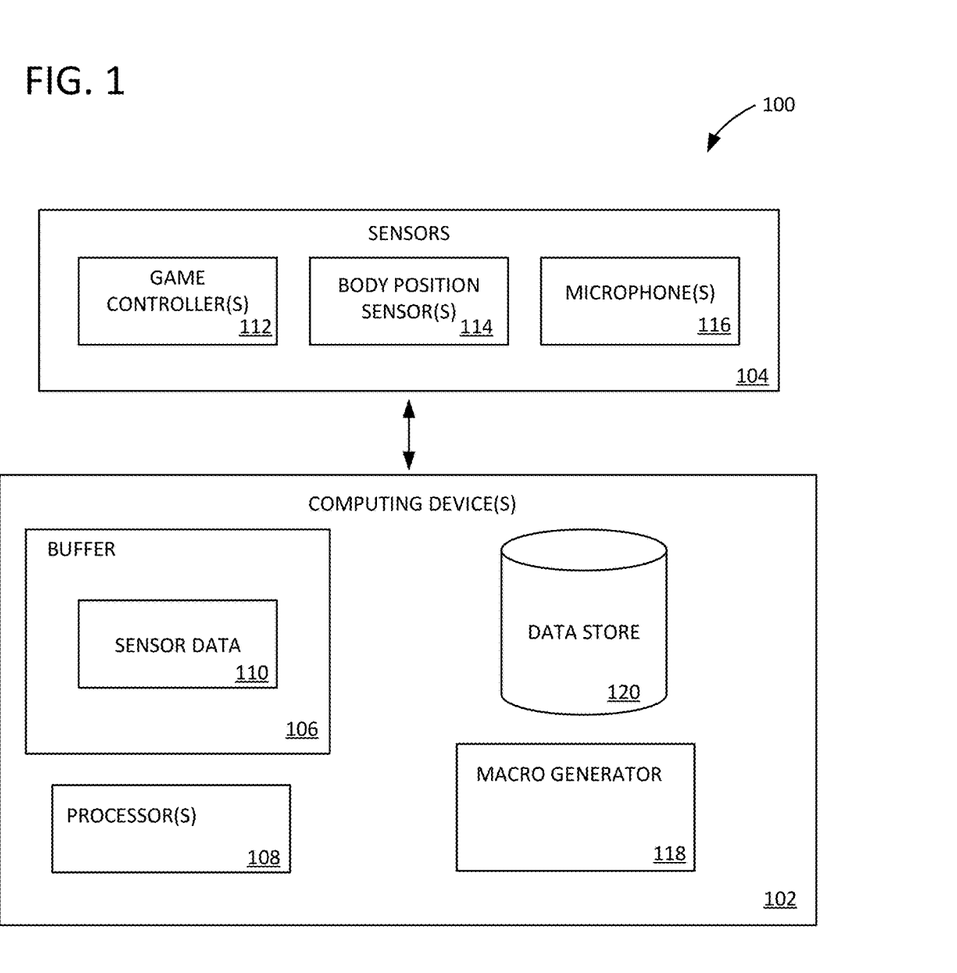
FIG. 1 is a block diagram of an example voice-triggered macro generation system.

FIG. 1 illustrates system 100 configured to generate voice-triggered macros. System 100 includes a computing device (or computing devices) 102 and sensors 104. In some examples, sensors 104 are not considered to be part of system 100. A buffer 106 is configured to, by one or more processors 108, receive sensor data 110 for one or more of sensors 104. Buffer 106 can be, for example, a stack (i.e., a last-in, first-out data structure) or other data structure.

Sensors 104 can include a number of different sensors, including one or more game controllers 112, one or more body position sensors 114, and one or more microphones 116. Game controllers 112 can be wired or wireless. Body position sensors 114 can include, for example, skeletal tracking sensors, cameras, or other sensors. Cameras can be infrared cameras or red-green-blue (RGB) cameras. Skeletal tracking can involve identifying and monitoring the position and movement of limbs, hands, head, eyes, or other body parts. Skeletal tracking sensors can include cameras, microphones, depth sensors, and other sensors. Sensors 104 can also include a keyboard, a mouse, and/or a touch and/or hover surface (e.g., a touchscreen or touchpad).

Sensor data 110 reflects one or more user actions. When sensor data 110 is based on user interaction with a game controller of game controllers 112, for example, sensor data 110 reflects a user's interaction with the various buttons or other controls on the game controller (e.g., pressing the "A" button, "B" button, moving a toggling stick control up and to the left, etc.). In such an example, sensor data 110 can include states or values for each of the buttons or other controls, and new sensor data can be generated either periodically or each time at least one state or value changes (e.g., a "1" for the A button if the A button has been pressed, coordinates for a toggling stick control position, etc.). Sensor data can also include body position data reflecting a user's gestures or movement as well as voice data (e.g., WAV, MP3, AAC, or other file representing captured audio) detected using one of microphones 116. For examples in which sensors 104 include a keyboard, mouse, and/or a touch and/or hover surface, sensor data 110 can include a sequence of keys pushed, mouse clicks, scrolls, or movement, and/or touch and/or hover input.

A macro generator 118 is configured to, by the one or more processors 108, receive a command to initiate creation of a voice-triggered macro. In some examples, macro generator 118 has voice recognition functionality. The received command can be or can be based on a voice command or gesture detected by, e.g., body position sensors 114 or microphones 116 and recognized by macro generator 118, a controller button sequence detected by a game controller of game controllers 112, or other user action. A voice command to initiate creation of a voice-triggered macro can be a predefined word or phrase (e.g., "start macro capture" or "record"). The voice command can also be in the form of interaction with a virtual intelligent personal assistant or other voice recognition technology (e.g., "Assistant, please record a macro." or "Assistant, save the last ten seconds.").

Macro generator 118 is further configured to determine a plurality of macro actions for the voice-triggered macro based on at least some of sensor data 110 in buffer 106. In some examples, sensor data 110 is recorded as the macro actions. In one such example, game controller data representing the states of various buttons or controls at a plurality of times is saved as a series of macro actions. In other examples, sensor data 110 is used to determine a series of actions, and the actions are saved as macro actions. For example, if the user interactions represented by sensor data 110 are an inefficient or round-about way of accomplishing a task (e.g., taking an indirect path through an item inventory in a video game), the macro action can be determined as a more direct series of actions involving fewer steps but reaching a same outcome.

Macro generator 118 is further configured to assign a speech key to the voice-triggered macro. The plurality of macro actions are performed when subsequent audio input is determined to match the speech key. The speech key can be provided, for example, by a user voice command (e.g., "macro speech key: 'bridge sequence'" or "Assistant, assign speech key "bridge sequence" to macro."). In some examples, a speech key is automatically assigned, either based on a default speech key list (e.g., "macro number one") or based on an identification of a context in which the macro is generated (e.g., "level two macro"). A speech key can also be selected by a user from a list or by using buttons of a game controller or other input device. Data store 120 can store generated voice-triggered macros, speech keys, or other data. Macro generator 118 can be implemented in a variety of ways, including as one or more plugins to a voice recognition application or as one or more stand-alone applications.

Computing device 102 can be a game console, mobile device, client computer (laptop or desktop PC) or other computing device. Computing device 102 can be configured to allow video game play (e.g., to execute one or more interactive game applications). Macro generator 118 can be configured to receive the command to initiate the voice-triggered macro (and to generate the macro) during play of a video game on system 100. In this way, a user can determine at any moment that they would like to capture certain user actions about to be performed in the video game (completing a certain task or tasks, gathering items, fighting an opponent having defined moves, etc.) as a voice-triggered macro.

Macro generator 118 can also be configured to initiate voice-triggered macro creation and associate user game play actions that occurred before the command to initiate creation was received. For example, a user performing a difficult game play sequence may not know in advance if the sequence will be completed successfully. If the user is successful, then the user can instruct system 100 to create a voice-triggered macro based on the completed actions. A number of actions to be included in the voice-triggered macro can be determined through presentation of a user interface that allows the user to select an initial action where the macro will begin. The interface can display, for example, a series of controller positions, a series of character or avatar actions, etc. The interface can also display a time (e.g., a time before the initiate macro creation command was received, a time since play began, a total time played for a character, etc.) or a section, level, etc. of the game.

In some examples, voice-triggered macros are generated in an online gaming environment. Sensor data 110 can first be stored locally and then transmitted to one or more remote server computers (not shown), and macro generator 118 can be implemented on the remote server computer(s).

Figure 2:
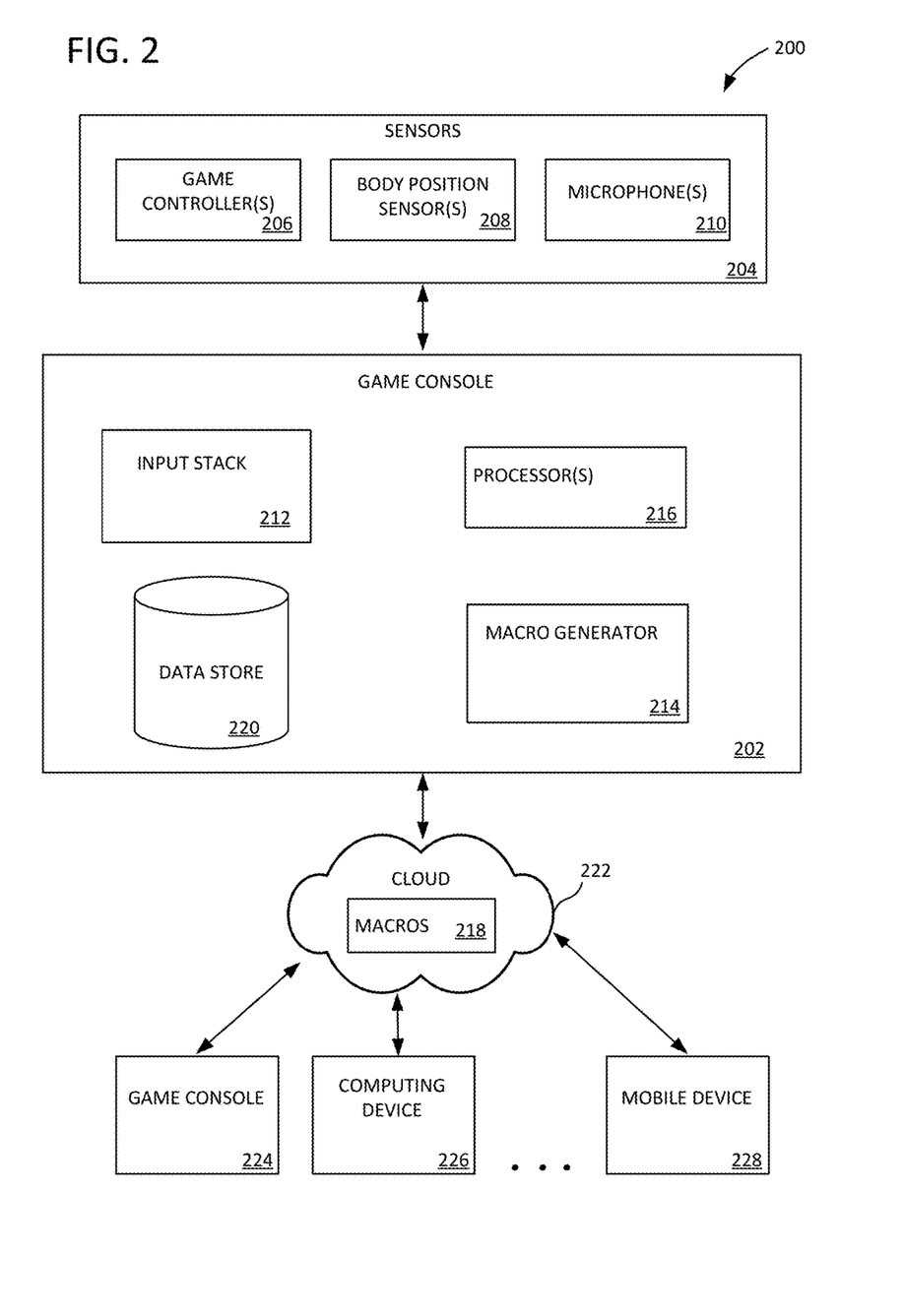
FIG. 2 is a block diagram of an example gaming environment including a game console with voice-triggered macro generation functionality.

FIG. 2 illustrates a system 200 configured to generate voice-triggered macros. System 200 includes a game console 202 and can also include sensors 204. Similar to FIG. 1, sensors 204 can include one or more game controllers 206, one or more body position sensors 208, and one or more microphones 210. An input stack 212 is configured to, by one or more processors 214, receive sensor data (not shown) for one or more of sensors 204. Input stack 212 is configured to store and provide data in a last-in, first-out manner. Rather than a stack, another type of buffer can also be used.

The sensor data stored in input stack 212 can be stored for each of game controller data, body position sensor data, and microphone (voice) data. Game controller data can comprise values for each of a plurality of controls or buttons. In an example in which a game controller has the buttons x, y, A, and B, as well as a toggle stick and trigger control, the following (pseudocode) example format can be used:

$$\text{struct} = \begin{cases} x = 1/0 \\ y = 1/0 \\ A = 1/0 \\ B = 1/0 \\ \text{stick} = (x, y) \\ \text{trigger} = 1/0 \end{cases}$$

In the above example format, a structure (struct) is used to represent the value or state of each button/control at an instant in time. The struct can also be stored with context information, such as a game ID, level ID, game or level section ID, or other ID that provides context to the data. Values for the struct can be stored each time the state of one variable (button/control) changes. Body position data can take the form of, for example, a matrix of data associated with the user's body (e.g., x, y, and/or z coordinates of portions of limbs, head, eyes, etc.). Body position data can also include various other body data, such as heart rate, temperature, or other information that system 200 has sensors capable of detecting.

Macro generator 214 is configured to, by processor(s) 216: receive a command to initiate creation of a voice-triggered macro; determine a plurality of macro actions for the voice-triggered macro based on at least some of the sensor data in the buffer; and assign a speech key to the voice-triggered macro. Macro generator 214 can be configured to generate a voice-triggered macro based on user actions (and corresponding sensor data stored in input stack 212) that occur before the command is received, after the command is received, or both. Various approaches to determining the plurality of macro actions based on the sensor data are discussed with respect to FIGS. 3-5 and 7. Game console 202 can also be connected to an external display such as a TV or computer monitor (not shown) that displays video game graphics generated by game console 202.

Voice-triggered macros 218 generated by macro generator 214 can be stored, for example, locally in data store 220, on a server computer (not shown), or in the cloud 222. The macros can be stored, for example, in binary, extensible markup language (XML), or other serialized data format. In some examples voice-triggered macros 218 can be shared among devices and/or users. In FIG. 2, game console 224, computing device 226, and mobile device 228 are connected via the Internet or other network to cloud 222 and can download voice-triggered macros 218 for local use. In some examples, when macro generator 214 creates a voice-triggered macro for a video game in a first environment (e.g., a console game), different versions of the macro that perform the same or similar functionality are created for other platforms or environments (e.g., desktop computer game, mobile game, etc.).

Thus, a first user can perform game play actions and use game console 202 to create a voice-triggered macro, upload the macro to voice-triggered macros 218 stored in cloud 222, and a second user associated with mobile device 228 can download an alternative version of the macro for use with a version of the video game running on mobile device 228. Alternative versions for different platforms can be created using context information associated with the first voice-triggered macro (e.g., game ID, level ID, location in level, etc.) and aligning the macro actions of the first macro with macro actions for the alternative versions. Similarly, sensor data in the first macro can be converted into corresponding instructions for the alternative platform that correspond to the controls available in the alternative platform.

Figure 3:
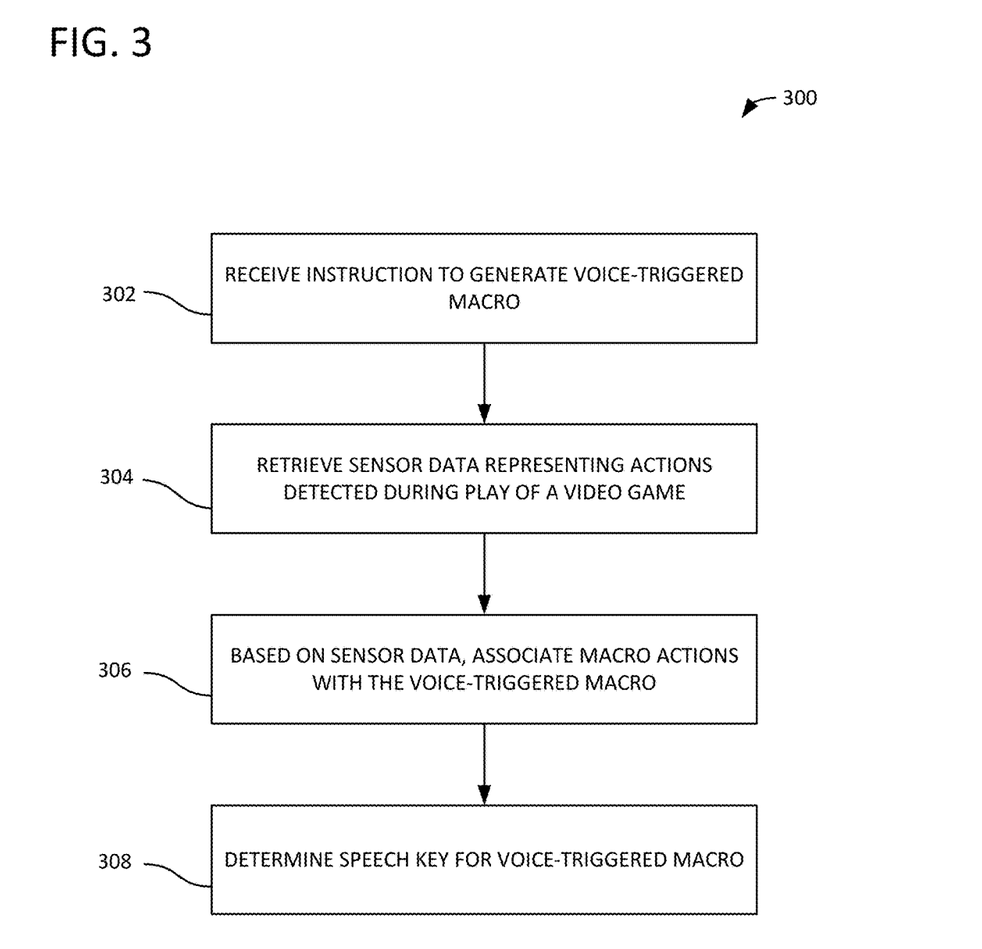
FIG. 3 is a flowchart of an example method for generating a voice-triggered macro.

FIG. 3 illustrates a method 300 of generating a voice-triggered macro. In process block 302, an instruction to generate a voice-triggered macro is received. The instruction can be, for example, based on a received voice command. In process block 304, sensor data generated by one or more sensors is received. The sensor data can represent, for example, user actions detected by one or more sensors during play of a video game. In process block 306, based on at least some of the sensor data, a plurality of macro actions are associated with the voice-triggered macro. In process block 308, a speech key for the voice-triggered macro is determined. Recognition of audio input matching the speech key triggers performance of the plurality of macro actions of the voice-triggered macro. In some examples, the sensor data corresponds to play of the video game that occurs after receiving the instruction to generate the voice-triggered macro and prior to receiving an end macro capture command. Such an example is presented in FIG. 5. In other examples, the sensor data corresponds to play of the video game that occurs prior to receiving the instruction. Such an example is presented in FIG. 4.

Method 300 can be performed using a variety of computing devices. In some examples, voice-triggered macros are generated during play of a video game on a game console, and the macro actions of the voice-triggered macro are based on user interactions with a game controller, body position sensor, microphone, etc. In other examples, voice-triggered macros are generated during play of a video game on a PC, tablet, smart phone, or other device, and the macro actions of the voice-triggered macro are based on user interactions with a keyboard, mouse, touchscreen, touchpad, microphone, etc. Generation of the voice-triggered macro can be done through interaction with a virtual intelligent personal assistant, for example.

Figure 4:
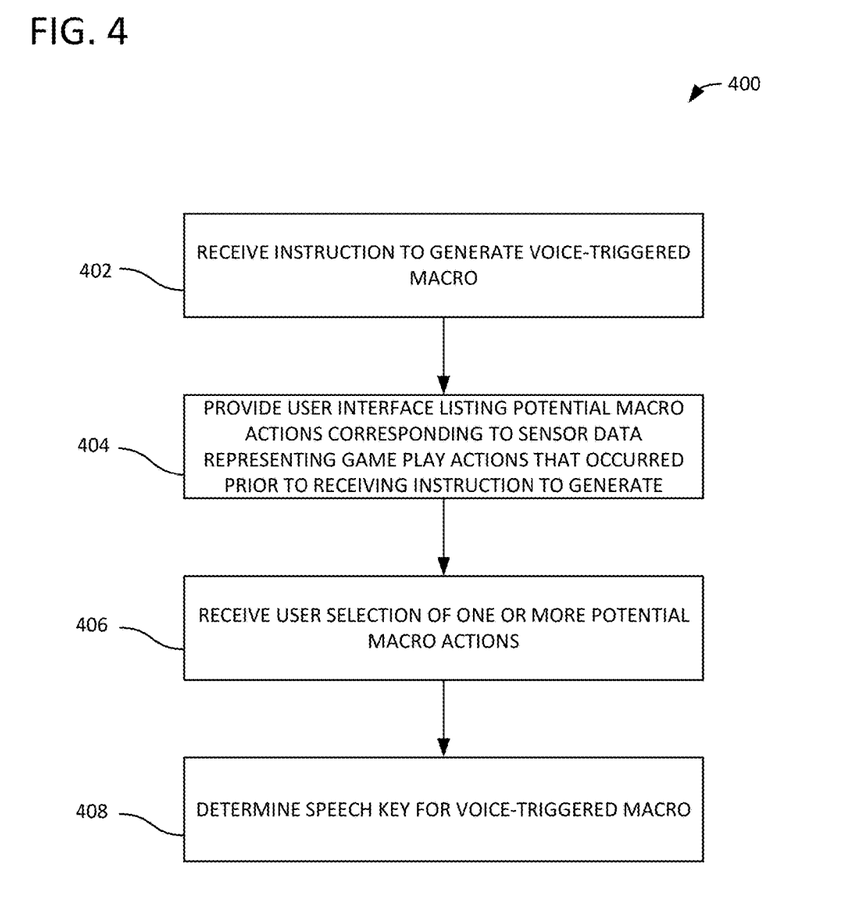
FIG. 4 is a flowchart of an example method for generating a voice-triggered macro in which the macro actions correspond to user actions that occurred prior to receiving an instruction to generate the macro.

FIG. 4 illustrates a method 400 of generating a voice-triggered macro. In process block 402, an instruction to generate a voice-triggered macro is received. In process block 404, a user interface listing potential macro actions for the voice-triggered macro is provided. The potential macro actions correspond to the retrieved sensor data, and the potential macro actions are selectable for inclusion in the voice-triggered macro by user input. For example, a predefined number of potential actions based on previously performed actions represented by sensor data can be displayed to the user, and the user can determine the point at which to start including potential actions in the macro (e.g., 10 moves or 10 seconds before the macro-creation instruction was received). A user selection of one or more potential macro actions is received in process block 406. In process block 408, a speech key for the voice-triggered macro is determined. An approach such as the approach illustrated in FIG. 4 allows a user to perform a series of actions, during video game play for example, and decide after performance of the actions to create a voice-triggered macro based on the actions.

Figure 5:
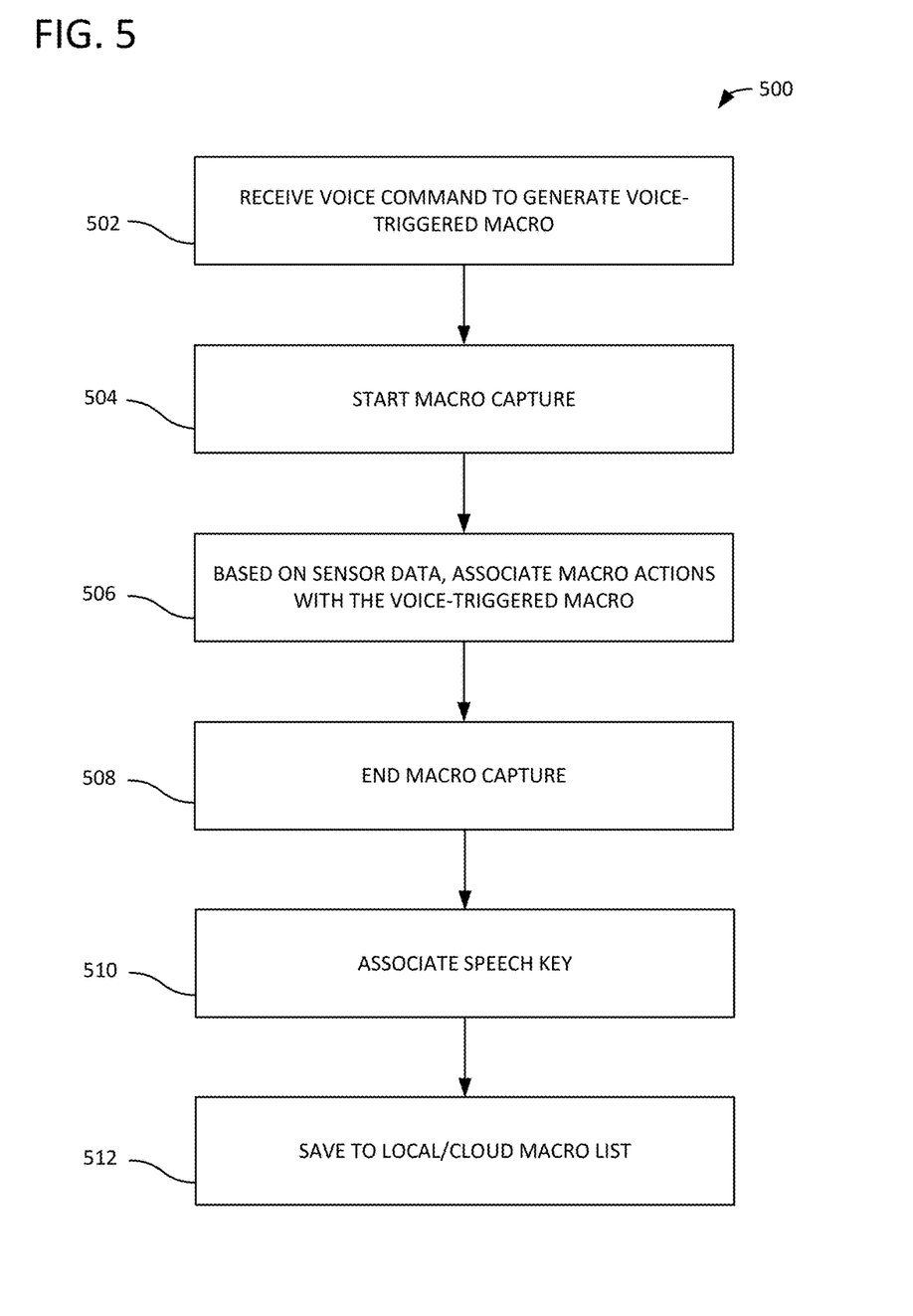
FIG. 5 is a flowchart of an example method for generating a voice-triggered macro in which the macro actions correspond to user actions that occur after receiving an instruction to generate the macro.

FIG. 5 illustrates a method 500 in which user actions performed between a start macro capture command and an end macro capture command are incorporated into a voice-triggered macro. In process block 502, a voice command initiating generation of a voice-triggered macro is received. In response to the voice command, macro capture starts in process block 504. In process block 506, macro actions are associated with the voice-triggered macro based on sensor data (e.g., as discussed with respect to FIGS. 1 and 2) during macro capture. Macro capture ends in process block 508. In some examples, macro capture ends as a result of an explicit voice or other command (e.g., "end macro capture"), the expiration of a timer, or the end of a level or stage in a video game. In process block 510 a speech key is associated with the voice-triggered macro. In some examples, the user is prompted for a speech key (e.g., "please name this macro"). In process block 512, the voice-triggered macro is saved to a local and/or cloud macro list.

Figure 6:
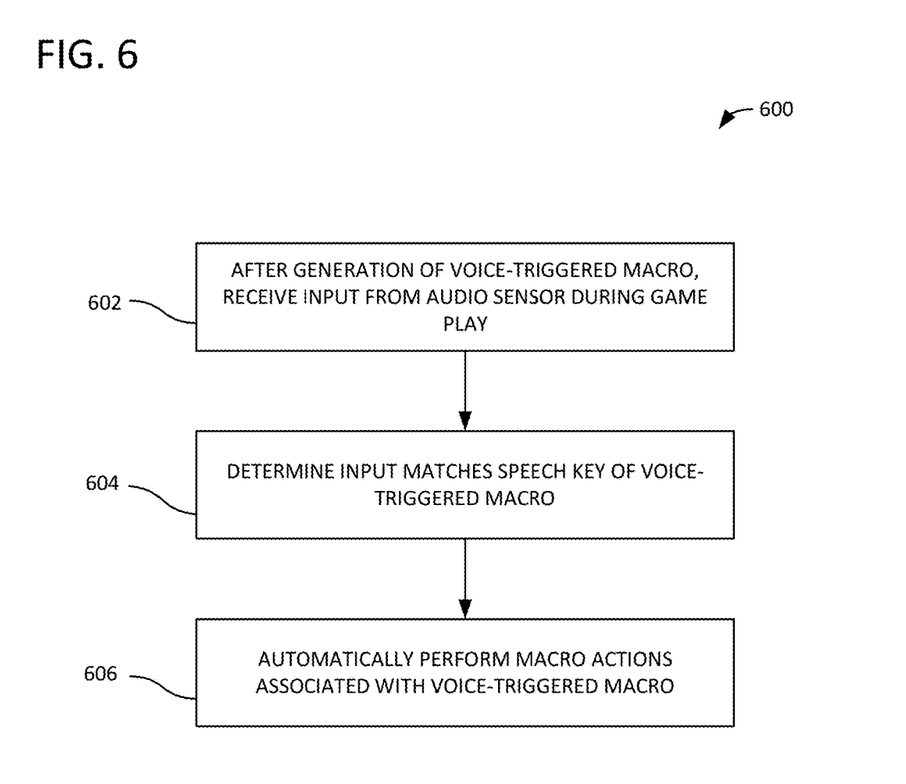
FIG. 6 is a flowchart of an example method for invoking a voice-triggered macro during video game play.

FIG. 6 illustrates a method 600 of invoking a voice-triggered macro during video game play. In process block 602, input is received from an audio sensor during game play after generation of a voice-triggered macro. For example, a user can speak an audio command which is detected using a microphone associated with a gaming system running a video game. In process block 604, it is determined whether the input matches the speech key of any available voice-triggered macros. The available voice-triggered macros can be created by the user or other users, and can be accessed locally or in the cloud. Upon determining that the audio input matches a speech key of a voice-triggered macro, the macro actions associated with the voice-triggered macro are automatically performed.

In some examples, available voice-triggered macros have an associated game ID or game classification (e.g., action, first-person shooter, etc.) that indicates the specific video game or type of game with which the macros can be used. In some examples, in addition to determining whether the speech key matches received audio input, the game ID or classification of the macro is compared to the game in which a user is attempting to invoke the macro.

In some examples, a video game being played alerts a user if there are available voice-controlled macros that can be used with the game. For example, when a user begins a game, a prompt can be presented indicating the available macros and a summary of the corresponding macro actions. In some examples, when a user approaches a level, section, or other location in a game associated with a voice-triggered macro, the user is prompted that there are available voice-triggered macro for the upcoming location. The prompt can be, for example, a displayed window and/or audio prompt.

Figure 7:
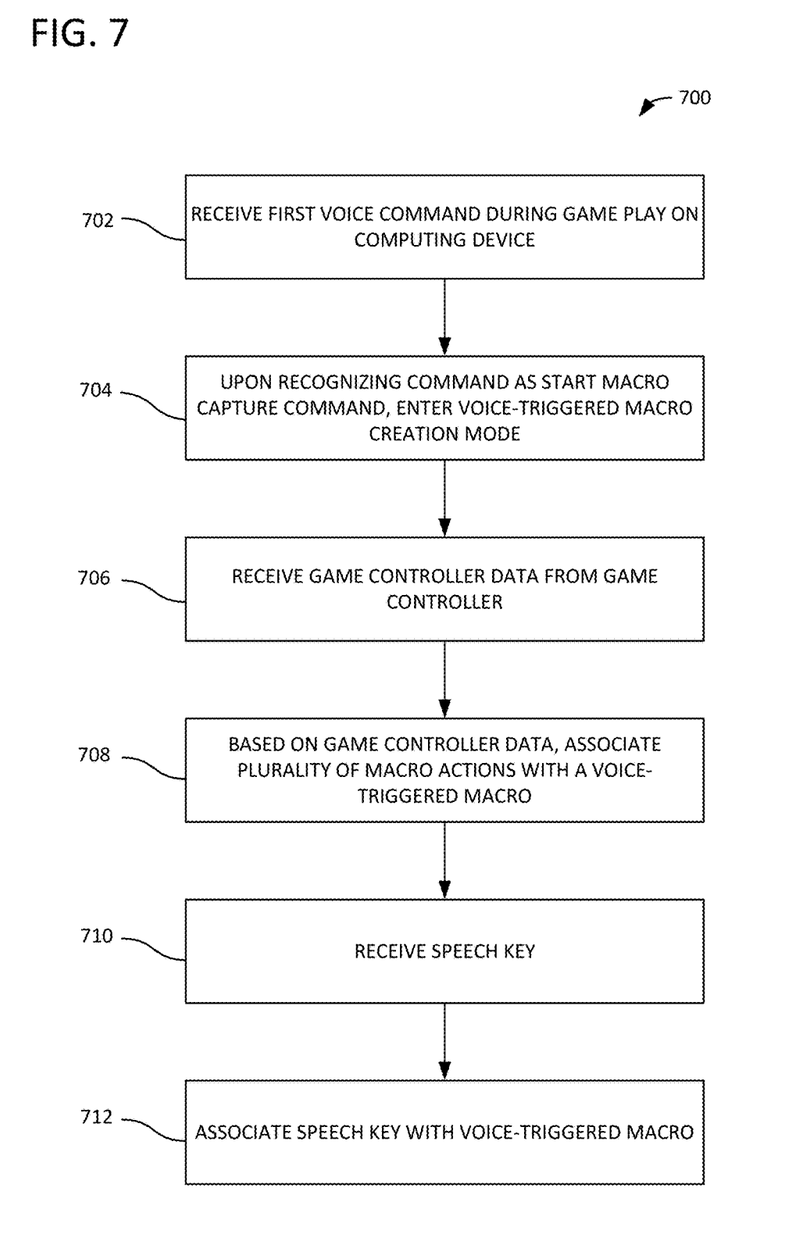
FIG. 7 is a flowchart of an example method for generating a voice-triggered macro during game play on a computing device.

FIG. 7 illustrates a method 700 of generating a voice-triggered macro during game play on a computing device. Process blocks 702, 704, 706, 708, 710, and 712 can be performed by the computing device. In process block 702, a first voice command is received during play of a video game on the computing device. In process block 704, upon recognizing the first voice command as a start macro capture command, a voice-triggered macro creation mode is entered. In process block 706, game controller data from a game controller is received. The game controller data reflects one or more user interactions with the game controller during play of the video game on the computing device while in the voice-triggered macro creation mode. Based on the game controller data, a plurality of macro actions is associated with a voice-triggered macro in process block 708. In process block 708, a speech key is received. The speech key can be, for example, a word or phrase spoken by the user. In process block 712, the speech key is associated with the voice-triggered macro such that the plurality of macro actions are automatically performed when subsequent audio input is determined to match the speech key.

In some examples, method 700 further comprises receiving a second voice command and, upon determining that the second voice command matches the speech key, performing the plurality of macro actions during play of the video game on the computing device. Method 700 can also comprise receiving a second voice command and, upon recognizing the second voice command as an end macro capture command, requesting the speech key and exiting the voice-triggered macro creation mode.

Example Computing Systems

Figure 8:
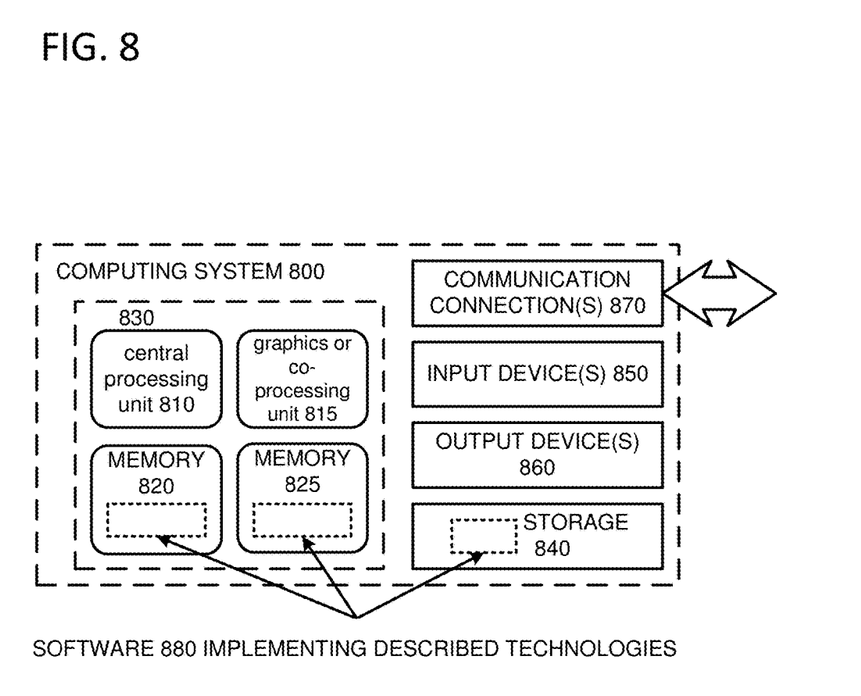
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). For example, memory 820, 825 can store macro generator 118 of FIG. 1 and/or macro generator 214 of FIG. 2.

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions for the software 880 implementing one or more innovations described herein. For example, storage 840 can store macro generator 118 of FIG. 1 and/or macro generator 214 of FIG. 2.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Mobile Devices

Figure 9:
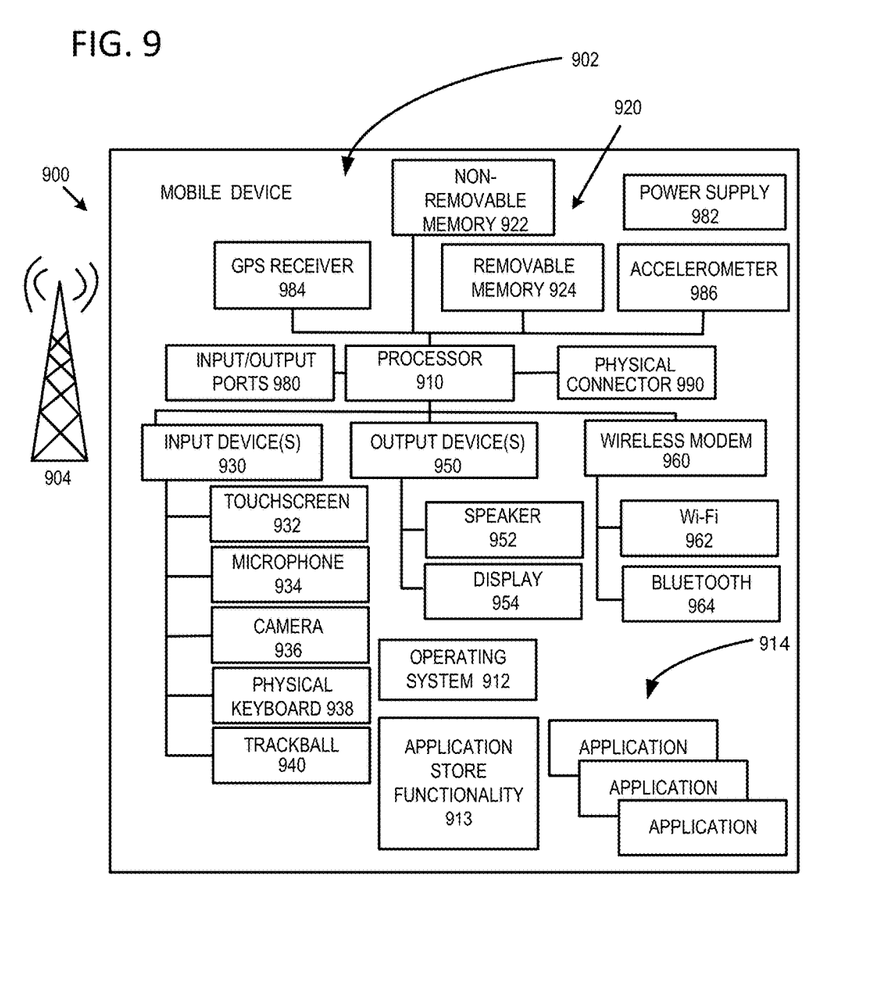
FIG. 9 is an example mobile device that can be used in conjunction with the technologies described herein.

FIG. 9 is a system diagram depicting an example mobile device 900 including a variety of optional hardware and software components, shown generally at 902. Any components 902 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 904, such as a cellular, satellite, or other network.

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more application programs 914. The application programs can include common mobile computing applications (e.g., email applications, calendars, contact managers, web browsers, messaging applications), or any other computing application. The application programs 914 can also include voice-triggered macro technology. Functionality 913 for accessing an application store can also be used for acquiring and updating application programs 914.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touchscreen 932, microphone 934, camera 936, physical keyboard 938 and/or trackball 940 and one or more output devices 950, such as a speaker 952 and a display 954. Other possible output devices (not shown) can include piezoelectric or other haptic output devices. Some devices can serve more than one input/output function. For example, touchscreen 932 and display 954 can be combined in a single input/output device.

The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice user interface that allows a user to operate the device 900 via voice commands. Further, the device 900 can comprise input devices and software that allows for user interaction via a user's spatial gestures, such as detecting and interpreting gestures to provide input to a gaming application.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM network for data and voice communications within a single cellular network, between cellular networks, or between the mobile device and a public switched telephone network (PSTN).

The mobile device can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be deleted and other components can be added.

Example Cloud-Supported Environments

Figure 10:
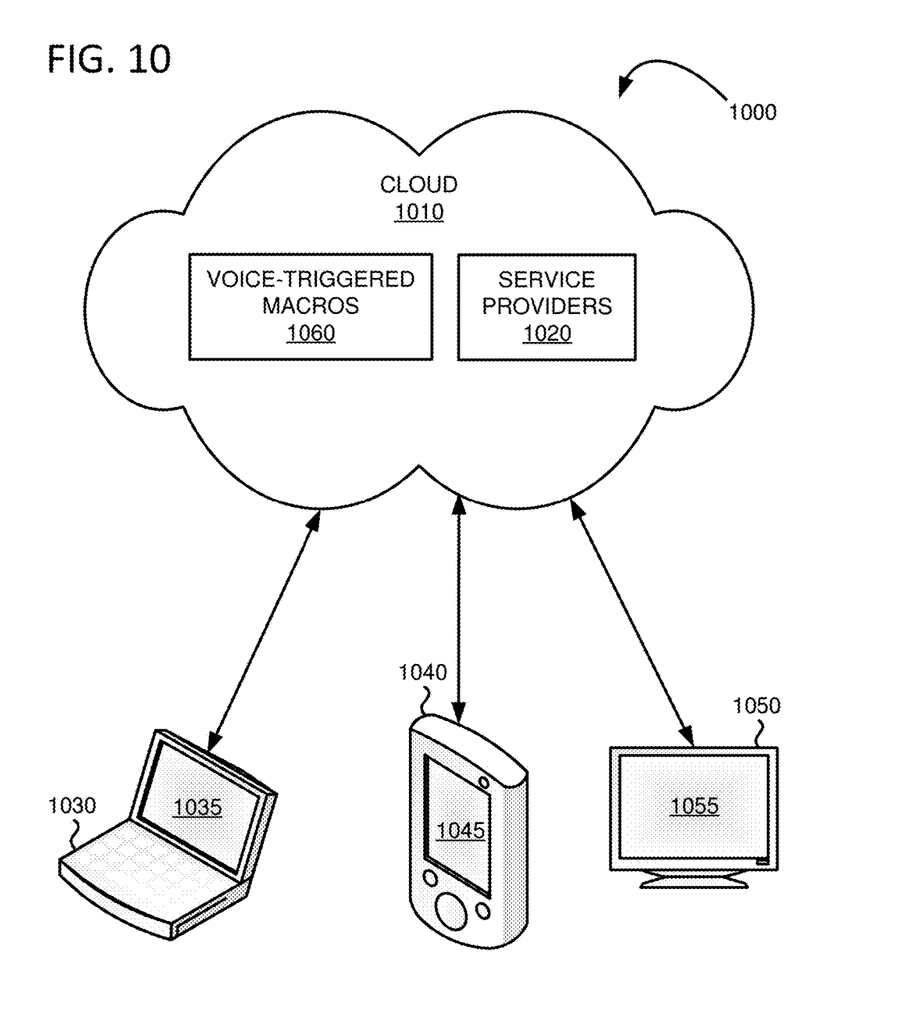
FIG. 10 is an example cloud-supported environment that can be used in conjunction with the technologies described herein.

FIG. 10 illustrates a generalized example of a suitable cloud-supported environment 1000 in which described embodiments, techniques, and technologies may be implemented. In the example environment 1000, various types of services (e.g., computing services) are provided by a cloud 1010. For example, the cloud 1010 can comprise a collection of computing devices, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, 1050) while other tasks (e.g., storage of data to be used in subsequent processing) can be performed in the cloud 1010.

In example environment 1000, the cloud 1010 provides services for connected devices 1030, 1040, 1050 with a variety of screen capabilities. Connected device 1030 represents a device with a computer screen 1035 (e.g., a mid-size screen). For example, connected device 1030 can be a personal computer such as desktop computer, laptop, notebook, netbook, or the like. Connected device 1040 represents a device with a mobile device screen 1045 (e.g., a small size screen). For example, connected device 1040 can be a mobile phone, smart phone, personal digital assistant, tablet computer, and the like. Connected device 1050 represents a device with a large screen 1055. For example, connected device 1050 can be a television screen (e.g., a smart television) or another device connected to a television (e.g., a set-top box or gaming console) or the like. One or more of the connected devices 1030, 1040, 1050 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touchscreen capability of a particular connected device (e.g., connected devices 1030, 1040, 1050).

In example environment 1000, the cloud 1010 provides the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 8, computer-readable storage media include memory 820 and 825, and storage 840. By way of example and with reference to FIG. 9, computer-readable storage media include memory and storage 920, 922, and 924. The term computer-readable storage media does not include signals and carrier waves. In addition, the term computer-readable storage media does not include communication connections (e.g., 870, 960, 962, and 964).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A system comprising:
   one or more processors;
   a buffer configured to, by the one or more processors, receive sensor data for one or more sensors, the sensor data representing user video game play actions performed during a video game play session; and
   a macro generator configured to, by the one or more processors:
   receive a command to initiate creation of a voice-triggered macro, the voice-triggered macro being based on the user video game play actions performed during the video game play session;
   determine a plurality of macro actions for the voice-triggered macro based on the sensor data in the buffer that represents the user video game play actions; and
   assign a speech key to the voice-triggered macro, wherein the plurality of macro actions are performed when audio input is determined to match the speech key.

2. The system of claim 1, wherein the macro generator is further configured to receive the command to initiate the voice-triggered macro during play of a video game on the system.

3. The system of claim 1, wherein the one or more sensors comprise at least one of a game controller or a body position sensor.

4. The system of claim 3, wherein the body position sensor is at least one of a camera or a skeletal-tracking sensor.

5. The system of claim 3, wherein the system further comprises the at least one of the game controller or the body position sensor.

6. The system of claim 1, wherein the macro generator is further configured to determine the plurality of macro actions based on sensor data received after the command to initiate creation of the voice-triggered macro is received.

7. The system of claim 1, wherein the macro generator is further configured to:
   receive a stop command; and
   upon receiving the stop command, present a user interface listing potential macro actions for the voice-triggered macro, the potential macro actions corresponding to sensor data received after the command to initiate creation of the voice-triggered macro is received and before the stop command is received, wherein the potential macro actions are selectable for inclusion in the voice-triggered macro by user input.

8. The system of claim 1, wherein the command to initiate creation of the voice-triggered macro is received, prior to determining the plurality of macro actions, as a voice command.

9. The system of claim 1, wherein the buffer is a stack.

10. The system of claim 1, wherein the system is part of a video game console.

11. One or more computer-readable media storing computer-executable instructions for causing a computing device to perform operations for voice-triggered macro generation, the operations comprising:
    receiving an instruction to generate a voice-triggered macro;
    retrieving sensor data generated by one or more sensors, the sensor data representing user video game play actions detected by one or more sensors during play of a video game;
    based on at least some of the sensor data detected by the one or more sensors during play of the video game, associating a plurality of macro actions with the voice-triggered macro, the macro actions corresponding to the user video game play actions; and
    determining a speech key for the voice-triggered macro, wherein recognition of audio input matching the speech key triggers performance of the plurality of macro actions of the voice-triggered macro.

12. The one or more computer-readable media of claim 11, wherein the computing device is a video game console, and wherein the one or more sensors comprise at least one of a game controller or a body position sensor.

13. The one or more computer-readable media of claim 11, wherein the sensor data corresponds to play of the video game that occurs after receiving the instruction to generate the voice-triggered macro and prior to receiving an end macro capture command.

14. The one or more computer-readable media of claim 11, wherein the operations further comprise upon receiving the instruction to generate the voice-triggered macro, providing a user interface listing potential macro actions for the voice-triggered macro, the potential macro actions corresponding to the retrieved sensor data, wherein the potential macro actions are selectable for inclusion in the voice-triggered macro by user input.

15. The one or more computer-readable media of claim 11, wherein the voice-triggered macro is usable in a plurality of video games.

16. The one or more computer-readable media of claim 11, wherein the instruction to generate the voice-triggered macro is based on a voice command received through a virtual intelligent personal assistant.

17. A voice-triggered macro method, the method comprising: at a computing device:
    receiving a first voice command during play of a video game on the computing device;
    upon recognizing the first voice command as a start macro capture command, entering a voice-triggered macro creation mode during play of the video game on the computing device;
    receiving game controller data from a game controller, the game controller data reflecting one or more user interactions with the game controller during play of the video game on the computing device, the one or more user interactions with the game controller occurring after receiving the first voice command and while in the voice-triggered macro creation mode;
    based on the game controller data, associating a plurality of macro actions with a voice-triggered macro;
    receiving a speech key; and
    associating the speech key with the voice-triggered macro such that the plurality of macro actions are automatically performed when subsequent audio input is determined to match the speech key.

18. The method of claim 17, further comprising:
    receiving a second voice command; and
    upon determining that the second voice command matches the speech key, performing the plurality of macro actions during play of the video game on the computing device.

19. The method of claim 17, further comprising:
    receiving a second voice command; and upon recognizing the second voice command as an end macro capture command, requesting the speech key and exiting the voice-triggered macro creation mode.

20. The method of claim 17, further comprising uploading the voice-triggered macro to cloud storage such that the voice-triggered macro is accessible over the Internet to a plurality of users.

* * * * *